US011492451B2

(12) United States Patent
Lim et al.

(10) Patent No.: US 11,492,451 B2
(45) Date of Patent: Nov. 8, 2022

(54) MANUFACTURING METHOD OF SUPER ABSORBENT POLYMER AND SUPER ABSORBENT POLYMER

(71) Applicant: LG Chem, Ltd., Seoul (KR)

(72) Inventors: Jong Doo Lim, Daejeon (KR); Young Sam Kim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 17/126,816

(22) Filed: Dec. 18, 2020

(65) Prior Publication Data

US 2021/0102031 A1   Apr. 8, 2021

Related U.S. Application Data

(62) Division of application No. 15/765,092, filed as application No. PCT/KR2016/010375 on Sep. 13, 2016, now Pat. No. 10,920,023.

(30) Foreign Application Priority Data

Mar. 11, 2016 (KR) .................. 10-2016-0029840
Aug. 10, 2016 (KR) .................. 10-2016-0101900

(51) Int. Cl.
| | |
|---|---|
| C08J 3/07 | (2006.01) |
| C08J 3/075 | (2006.01) |
| C08J 3/12 | (2006.01) |
| C08J 3/24 | (2006.01) |
| C08F 2/10 | (2006.01) |
| C08F 2/50 | (2006.01) |
| C08F 20/06 | (2006.01) |
| C08K 7/26 | (2006.01) |

(52) U.S. Cl.
CPC .............. *C08J 3/075* (2013.01); *C08F 2/10* (2013.01); *C08F 2/50* (2013.01); *C08F 20/06* (2013.01); *C08J 3/12* (2013.01); *C08J 3/24* (2013.01); *C08J 3/245* (2013.01); *C08K 7/26* (2013.01); *C08J 2333/02* (2013.01)

(58) Field of Classification Search
CPC ....... C08J 3/075; C08J 3/24; C08J 3/12; C08J 3/245; C08J 3/03; C08J 2333/02; C08J 2300/14; C08F 2/10; C08F 2/50; C08F 2/44; C08F 20/06; C08F 222/102; C08F 220/06; C08K 7/26; C08K 3/34; C08L 33/02
See application file for complete search history.

(56) References Cited

U.S. PATENT DOCUMENTS

| | | | |
|---|---|---|---|
| 4,950,692 A | 8/1990 | Lewis et al. | |
| 4,970,267 A | 11/1990 | Bailey et al. | |
| 5,064,582 A | 11/1991 | Sutton et al. | |
| 5,563,218 A | 10/1996 | Rebre et al. | |
| 5,945,495 A | 8/1999 | Daniel et al. | |
| 2006/0183828 A1 | 8/2006 | Dairoku et al. | |
| 2007/0123658 A1 | 5/2007 | Torii et al. | |
| 2010/0099781 A1 | 4/2010 | Tian et al. | |
| 2014/0323663 A1 | 10/2014 | Plochinger et al. | |
| 2015/0259522 A1 | 9/2015 | Lee et al. | |
| 2015/0283284 A1 | 10/2015 | Azad et al. | |
| 2016/0214082 A1 | 7/2016 | Lee et al. | |
| 2016/0332143 A1 | 11/2016 | Sim et al. | |
| 2019/0040173 A1 | 2/2019 | Lee et al. | |

FOREIGN PATENT DOCUMENTS

| | | | | |
|---|---|---|---|---|
| CN | 104086938 A | 10/2014 | | |
| CN | 104974312 A | 10/2015 | | |
| CN | 105209524 A | 12/2015 | | |
| EP | 0615736 A1 | 9/1994 | | |
| EP | 0644211 A1 | 3/1995 | | |
| EP | 0644224 A1 | 3/1995 | | |
| EP | 0463388 B1 | 3/1996 | | |
| EP | 1400556 A1 | 3/2004 | | |
| EP | 1637105 A1 | 3/2006 | | |
| EP | 1690887 A1 | 8/2006 | | |
| EP | 1690887 A1 * | 8/2006 | ............. | B01J 20/26 |
| EP | 1730218 B1 | 12/2010 | | |
| EP | 2881419 A1 | 6/2015 | | |
| EP | 2957576 A1 | 12/2015 | | |
| EP | 3321306 A1 | 5/2018 | | |
| EP | 2797566 B1 | 6/2019 | | |
| JP | H08073606 A | 3/1996 | | |
| JP | H08253597 A | 10/1996 | | |
| JP | 3135878 B2 | 2/2001 | | |
| JP | 4199330 B2 | 12/2008 | | |
| JP | 2011218357 A | 11/2011 | | |
| JP | 2013034942 A | 2/2013 | | |
| JP | 2014039927 A | 3/2014 | | |
| KR | 20040015077 A | 2/2004 | | |
| KR | 2011-0087293 A | 8/2011 | | |

(Continued)

OTHER PUBLICATIONS

Schwalm, Reinhold, "UV Coatings: Basics, Recent Developments and New Applications", Elsevier Science, Dec. 21, 2006, p. 115.
Odian, George, "Principles of Polymerization", John Wiley and Sons, Inc. Oct. 1981, p. 203.
International Search Report for PCT/KR2016/010375 dated Jan. 9, 2017.
Extended European Search Report including Written Opinion for Application No. EP16893687.0 dated Oct. 5, 2018.
Third Party Observation for Application No. PCT/KR2016/010375 mailed Aug. 10, 2018.

(Continued)

*Primary Examiner* — Sanza L. McClendon
(74) *Attorney, Agent, or Firm* — Lerner, David, Littenberg, Krumholz & Mentlik, LLP

(57) ABSTRACT

The present invention relates to a super absorbent polymer and a manufacturing method thereof. More particularly, the present invention relates to a manufacturing a fine powder reassembly in which excellent physical properties are maintained.

4 Claims, No Drawings

(56) References Cited

FOREIGN PATENT DOCUMENTS

| KR | 20140063457 A | 5/2014 |
|---|---|---|
| KR | 20140119103 A | 10/2014 |
| KR | 20140145810 A | 12/2014 |
| KR | 20150061270 A | 6/2015 |
| KR | 20150064700 A | 6/2015 |
| KR | 20150082123 A | 7/2015 |
| KR | 20160004967 A | 1/2016 |
| WO | 2015084059 A1 | 6/2015 |

OTHER PUBLICATIONS

Chinese Search Report from Application No. 201680057846.6 dated Sep. 2, 2019, 2 pages.
Third Party Obeservation for Application No. EP16893687 dated Jan. 9, 2020.
Bucholz et al,. "Modern Superabsorbent Polymer Technology", Wiley-VCH, Copyright 1998, pp. 199-201.

\* cited by examiner

MANUFACTURING METHOD OF SUPER ABSORBENT POLYMER AND SUPER ABSORBENT POLYMER

CROSS-REFERENCE TO RELATED APPLICATIONS

This application is a divisional of U.S. application Ser. No. 15/765,092, filed on Mar. 30, 2018, which is a national phase entry under 35 U.S.C. § 371 of International Application No. PCT/KR2016/010375, filed on Sep. 13, 2016, which claims the benefit of Korean Patent Application No. 10-2016-0029840, filed in the Korean Intellectual Property Office on Mar. 11, 2016, and Korean Patent Application No. 10-2016-0101900, filed in the Korean Intellectual Property Office on Aug. 10, 2016, the entire contents of which are incorporated herein by reference.

BACKGROUND OF THE INVENTION

(a) Field of the Invention

The present invention relates to a super absorbent polymer and a manufacturing method thereof. More particularly, the present invention relates to a super absorbent polymer capable of manufacturing a fine powder reassembly exhibiting excellent absorption characteristic while having improved assembling strength, and a manufacturing method thereof.

(b) Description of the Related Art

A super absorbent polymer (SAP) is a synthetic polymeric material capable of absorbing water five hundred up to one thousand times the mass of its own. Commercial productions of the SAP began for use in sanitary equipments, nowadays, the use of SAP may be found in a very wide range of applications, including water combination soils for gardening, water-stop materials for engineering and construction, sheets for raising seeding, freshness-keeping agents in the food distribution field, and materials for sweating rooms, as well as personal hygiene products, such as disposable baby diapers.

An absorption mechanism of the super absorbent polymer is governed by interaction of osmotic pressure due to difference in electrical attraction caused by charges of a polymer electrolyte, affinity between water and a polymer electrolyte, molecular expansion due to repulsion between polymer electrolyte ions, and inhibition of expansion due to cross-linking. In other words, water absorbency of the absorbent polymer depends on the above-described affinity and molecular expansion, and an absorption speed depends greatly on osmotic pressure of an absorbent polymer itself.

A number of researches have been conducted to improve the absorption speed of the super absorbent polymer. For example, Korean Patent Laid-Open Publication No. 2014-0063457 discloses a preparation method for super absorbent polymer including preparing a fine powder reassembly by using only fine powder and a base resin without an additive. However, there are problems in that physical properties of the fine powder reassembly are deteriorated as compared to the base resin, and the process is complicated, and efficiency is reduced.

Further, in order to solve the deterioration in physical properties of a product formed with the fine powder which is inevitably generated in a manufacturing process of the super absorbent polymer, there is a method of adding the fine powder at the time of polymerization. However, this method has problems in that non-uniform polymerization is induced or light is scattered to interfere with polymerization, thereby causing deterioration of physical properties. Accordingly, a method of reassembling the fine powder using a separate reassembling machine was developed, wherein large particles are manufactured by mixing a fine powder and water at a predetermined ratio. This technique has problems in that since the absorption speed is increased due to a small particle size of the fine powder, moisture is non-uniformly mixed, and thus non-uniformity occurs in the entire reassembly, thereby manufacturing a reassembly having non-uniform size and strength. Meanwhile, when the particles are hard, an apparatus is damaged during pulverization due to incomplete drying, and when the particles are weakly reassembled, the particles are easily crushed and returned to the fine powder, and thus performance of the reassembly is deteriorated.

The present invention has been made in an effort to provide a super absorbent polymer including a fine powder reassembly which is excellent in assembling strength and does not cause deterioration of physical property such as centrifugal retention capacity (CRC) or absorption under pressureDeletedTexts (AUP), and a manufacturing method thereof.

SUMMARY OF THE INVENTION

An exemplary embodiment of the present invention provides a manufacturing method of a super absorbent polymer including:

forming a hydrogel polymer by performing thermal polymerization or photopolymerization on a monomer composition including a water-soluble ethylenically unsaturated monomer and a polymerization initiator; performing coarse-pulverization on the hydrogel polymer; drying and pulverizing the coarse-pulverized hydrogel polymer and performing classification into fine powder having a particle diameter of less than 150 μm and normal particles having a particle diameter of 150 to 850 μm; preparing a fine powder aqueous solution by mixing the fine powder, water, and an additive; and manufacturing a fine powder reassembly by mixing the fine powder aqueous solution and the coarse-pulverized hydrogel polymer.

Another embodiment of the present invention provides, a super absorbent polymer in which a fine powder reassembly, which is obtained by mixing fine powder with sodium hydroxide and performing reassembly, is subjected to surface cross-linking, wherein the fine powder has a particle diameter of less than 150 μm in a polymer obtained by polymerizing a water-soluble ethylenically unsaturated monomer in which an acidic group is included and at least one portion of the acidic group is neutralized, wherein a centrifugal retention capacity (CRC) measured according to EDANA method WSP 241.3 is 33.0 to 39.0 g/g; a 0.7 psi absorption under pressure (AUP) measured according to EDANA method WSP 241.3 is 20.0 to 25.0 g/g; and an absorption speed by a vortex method is 100 seconds or less.

According to the super absorbent polymer of the present invention and the manufacturing method thereof, it is possible to improve assembly strength by using an additive at the time of reassembling the fine powder to thereby reduce a content of the fine powder to be recrushed as compared to fine powder reassembly according to the conventional fine powder reassembling process.

Further, by mixing the fine powder with the hydrogel polymer and performing reassembly, it is possible to obtain a fine powder reassembly that exhibits centrifugal retention capacity (CRC) or absorption under pressure (AUP) having a similar level to the hydrogel polymer. Therefore, even though when the fine powder reassembly manufactured according to the present invention is mixed with the super absorbent polymer having a normal grain size, followed by recycling, physical properties of the entire resin are not deteriorated, and thus it is possible to provide a high-quality super absorbent polymer.

In addition, since the reassembly process is performed by mixing the fine powder with the hydrogel polymer, the process step is relatively simple, and thus it is possible to obtain a reassembly with high efficiency and high absorption speed.

DETAILED DESCRIPTION OF THE EMBODIMENTS

The terms used herein is for the purpose of describing exemplary embodiments only and is not intended to be limiting the present invention Singular forms are intended to include plural forms as well, unless the context clearly indicates otherwise. It will be further understood that the terms "comprises", "provides" and/or "has," when being used in this specification, specify the presence of stated features, numbers, steps, or components, or combinations thereof, but do not exclude the presence or addition of one or more other features, numbers, steps, components, or combinations thereof.

Although the present invention may be modified variously and have several embodiments, the exemplary embodiments are illustrated in the accompanying drawings and will be described in detail in the detailed description. However, the present invention is not limited to the specific embodiments and should be construed as including all the changes, equivalents, and substitutions included in the spirit and scope of the present invention.

Hereinafter, a super absorbent polymer and a manufacturing method of the super absorbent polymer according to a specific exemplary embodiment of the present invention will be described in detail.

The manufacturing method of a super absorbent polymer according to an exemplary embodiment of the present invention includes forming a hydrogel polymer by performing thermal polymerization or photopolymerization on a monomer composition including a water-soluble ethylenically unsaturated monomer and a polymerization initiator; performing coarse-pulverization on the hydrogel polymer; drying and pulverizing the coarse-pulverized hydrogel polymer and performing classification into fine powder having a particle diameter of less than 150 μm and normal particles having a particle diameter of 150 to 850 μm; preparing a fine powder aqueous solution by mixing the fine powder, water, and an additive; and manufacturing a fine powder reassembly by mixing the fine powder aqueous solution and the coarse-pulverized hydrogel polymer.

For reference, the term "polymer" or "high molecule" in the present specification means that a water-soluble ethylenically unsaturated monomer is in a polymerized state, and may include all water content ranges, all particle diameter ranges, all surface cross-linking states or processing states. Among the polymers, a polymer in which a percentage of moisture content (water content) is about 40 wt % or more before drying is performed after polymerization may be referred to as a hydrogel polymer. Further, among the polymers, a polymer having a particle diameter of less than 150 μm may be referred to as "fine powder".

Further, "the super absorbent polymer" means the polymer itself according to the context, or includes all polymers in a state suitable for commercialization through further processes such as surface cross-linking, fine powder reassembly, drying, pulverization, classifying, etc., with respect to the polymer.

In the manufacturing method of a super absorbent polymer of the present invention, first, the hydrogel polymer is formed by performing thermal polymerization or photopolymerization on a monomer composition including a water-soluble ethylenically unsaturated monomer and a polymerization initiator. The monomer composition which is a raw material of the super absorbent polymer includes the water-soluble ethylenically unsaturated monomer and the polymerization initiator.

The water-soluble ethylenically unsaturated monomer may be any monomer generally used in manufacturing the super absorbent polymer without any particular limitations. Here, the water-soluble ethylenically unsaturated monomer may be at least any one selected from the group consisting of anionic monomers and salts thereof, nonionic hydrophile-containing monomers, and unsaturated monomers containing amino groups, and quarternary compounds thereof.

Specifically, the water-soluble ethylenically unsaturated monomer may be at least any one selected from the group consisting of anionic monomers such as methacrylic acid, anhydrous maleic acid, fumaric acid, crotonic acid, itaconic acid, 2-acryloyl ethane sulfonic acid, 2-methacryloyl ethane sulfonic acid, 2-(meth)acryloyl propane sulfonic acid, or 2-(meth)acrylamide-2-methyl propane sulfonic acid, and salts thereof; nonionic hydrophile-containing monomers such as (meth)acrylamide, N-substituted(meth)acrylate, 2-hydroxyethyl(meth)acrylate, 2-hydroxypropyl(meth)acrylate, methoxypolyethylene glycol(meth)acrylate, or polyethylene glycol(meth)acrylate; and unsaturated monomers containing amino groups such as (N,N)-dimethylaminoethyl (meth)acrylate, or (N,N)-dimethylaminopropyl(meth) acrylamide, and quarternary compounds thereof.

More preferably, the acrylic acid or salts thereof, for example, an acrylic acid or alkali metal salts such as sodium salts thereof may be used. By using the monomer, it is possible to manufacture a super absorbent polymer having more excellent physical properties. When the alkali metal salt of the acrylic acid is used as the monomer, the acrylic acid may be neutralized with a basic compound such as caustic soda (NaOH) and used.

A concentration of the water-soluble ethylenically unsaturated monomer may be about 20 to about 60 wt %, preferably about 40 to about 50 wt %, based on the monomer composition including a raw material and a solvent of the super absorbent polymer, and may be controlled in consideration of polymerization time and reaction condition, etc. However, when the concentration of the monomer is excessively low, the super absorbent polymer may have a low yield and have an economical problem. On the other hand, when the concentration thereof is excessively high, process problems may occur, for example, a part of the monomer may precipitate, pulverization efficiency may be low at the time of pulverizing the polymerized hydrogel polymer, etc., and physical properties of the super absorbent polymer may be deteriorated.

In the manufacturing method of a super absorbent polymer of the present invention, the polymerization initiator used in polymerization is not particularly limited as long as it is generally used in manufacturing the super absorbent polymer.

Specifically, as the polymerization initiator, a thermal polymerization initiator or a photopolymerization initiator according to UV irradiation may be used depending on a polymerization method. Meanwhile, even if the photopolymerization method is performed, the thermal polymerization initiator may be additionally included since a predetermined amount of heat occurs by irradiation including ultraviolet irradiation, etc., and in addition, as the polymerization reaction which is an exothermic reaction proceeds, some degree of heat occurs.

The photopolymerization initiator may be used without limitation in view of constitution as long as it is a compound capable of forming a radical by light such as ultraviolet rays.

The photopolymerization initiator may be, for example, at least one selected from the group consisting of benzoin ether, dialkyl acetophenone, hydroxyl alkylketone, phenyl glyoxylate, benzyl dimethyl ketal, acyl phosphine, and α-aminoketone. Meanwhile, as a specific example of the acylphosphine, a commonly used lucirin TPO, that is, 2,4, 6-trimethyl-benzoyl-trimethyl phosphine oxide may be used. More various photo-polymerization initiators are well described in "UV Coatings: Basics, Recent Developments and New Application (Elsevier, 2007)", page 115, written by Reinhold Schwalm. However, the present invention is not limited to the above-described examples.

The photopolymerization initiator may be included at a concentration of about 0.01 to about 1.0 wt % based on the monomer composition. When the concentration of the photopolymerization initiator is excessively low, a polymerization speed may be reduced. When the concentration of the photopolymerization initiator is excessively high, a molecular weight of the super absorbent polymer may be small and physical properties thereof may be non-uniform.

In addition, the thermal polymerization initiator may be at least one selected from the group consisting of a persulfate-based initiator, an azo-based initiator, hydrogen peroxide, and an ascorbic acid. Specifically, examples of the persulfate-based initiator may include sodium persulfate ($Na_2S_2O_8$), potassium persulfate ($K_2S_2O_8$), ammonium persulfate (($NH_4$)$_2S_2O_8$), and the like, and examples of the azo-based initiator may include 2,2-azobis(2-amidinopropane)dihydrochloride, 2,2-azobis-(N,N-dimethylene)isobutyramidine dihydrochloride, 2-(carbamoylazo)isobutylonitrile, 2,2-azobis[2-(2-imidazolin-2-yl)propane] dihydrochloride, 4,4-azobis-(4-cyanovaleric acid), and the like. More various thermal initiators are well described in "Principle of Polymerization (Wiley, 1981)", page 203, written by Odian. However, the present invention is not limited to the above-described examples.

The thermal polymerization initiator may be included at a concentration of about 0.001 to about 0.5 wt % based on the monomer composition. When the concentration of the thermal polymerization initiator is excessively low, additional thermal polymerization is hardly performed, and thus, an effect of addition of the thermal polymerization initiator may be insignificant. When the concentration of the thermal polymerization initiator is excessively high, the molecular weight of the super absorbent polymer may be small and physical properties thereof may be non-uniform.

According to an exemplary embodiment of the present invention, the monomer composition may further include an internal cross-linking agent as a raw material for the super absorbent polymer. As the internal cross-linking agent, a cross-linking agent having at least one functional group capable of reacting with a water-soluble substituent of the water-soluble ethylenically unsaturated monomer while having at least one ethylenically unsaturated group; or a cross-linking agent having at least two functional groups capable of reacting with the water-soluble substituent of the monomer and/or a water-soluble substituent formed by hydrolysis of the monomer, may be used.

Specific examples of the internal cross-linking agent may include C8-C12 bisacrylamide, bismethacrylamide, poly (meth)acrylate of C2-C10 polyol or poly(meth)allylether of C2-C10 polyol, and more specifically, at least one selected from the group consisting of N,N'-methylenebis(meth)acrylate, ethyleneoxy(meth)acrylate, polyethyleneoxy(meth) acrylate, propyleneoxy(meth)acrylate, glycerin diacrylate, glycerin triacrylate, trimethylol triacrylate, triallyl amine, triallyl cyanurate, triallyl isocyanate, polyethylene glycol, diethylene glycol, and propylene glycol.

The internal cross-linking agent may be included at a concentration of about 0.01 to about 0.5 wt % based on the monomer composition, thereby cross-linking the polymerized polymer.

Further, the monomer composition of the manufacturing method of the super absorbent polymer according to an exemplary embodiment may further include additives such as a thickener, a plasticizer, a storage stabilizer, an antioxidant, etc., if necessary.

The above-described raw materials such as the water-soluble ethylenically unsaturated monomer, the photopolymerization initiator, the thermal polymerization initiator, the internal cross-linking agent, and the additives may be prepared in a form of a monomer composition solution dissolved in a solvent.

Here, the solvent that is usable without limitation in view of constitution as long as it is capable of dissolving the above-described components. For example, the solvent may be used in combination of at least one selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butylolactone, carbitol, methylcellosolve acetate, and N,N-dimethylacetamide, etc.

The solvent may be included in a residual content excluding the above-described components with respect to the total content of the monomer composition.

Meanwhile, a method of forming the hydrogel polymer by thermal polymerization or photopolymerization of such a monomer composition is not particularly limited in view of constitution as long as it is a generally used polymerization method.

Specifically, the polymerization method is largely divided into thermal polymerization and photopolymerization depending on a polymerization energy source. It is general the thermal polymerization may be performed in a reactor having an agitator shaft such as a kneader, and the photopolymerization may be performed in a reactor equipped with a movable conveyor belt. However, these above-described polymerization methods are described by way of example, and the present invention is not limited to the above-described polymerization methods.

For example, the hydrogel polymer obtained by supplying hot air to the reactor such as the kneader equipped with the agitator shaft as described above, or heating the reactor to perform the thermal polymerization may be discharged to a reactor outlet according to a form of the agitator shaft provided in the reactor, and may have a size of several centimeters to several millimeters. Specifically, the size of the obtained hydrogel polymer may vary depending on the concentration, an injection speed, etc., of the monomer composition to be injected. Generally, the hydrogel polymer may have a weight average particle diameter of 2 to 50 mm.

In addition, when the photopolymerization is performed in the reactor provided with the movable conveyer belt as described above, the generally obtained hydrogel polymer may be a sheet-shaped hydrogel polymer having a width of the belt. Here, the thickness of the polymer sheet varies depending on the concentration and the injection speed of the monomer composition to be injected, but it is preferred to supply the monomer composition so that it is possible to obtain the sheet-shaped polymer having a thickness of generally about 0.5 to about 5 cm. When supplying the monomer composition such an extent that the thickness of the sheet-shaped polymer has an excessively thin thickness, it is not preferred since production efficiency may be low. When the thickness of the sheet-shaped polymer is more than 5 cm, the polymerization reaction may not be uniformly performed throughout an overall thickness due to the excessively thick thickness.

Here, a percentage of moisture content of the hydrogel polymer obtained by this method may be generally about 40 to about 80 wt %. Meanwhile, throughout the present specification, the term "percentage of moisture content" refers to a content of moisture occupied with respect to the total weight of the hydrogel polymer, and means a value obtained by subtracting a weight of a dried polymer from the weight of the hydrogel polymer. Specifically, the water content is defined as a value calculated by measuring a weight loss due to moisture evaporation in the polymer during a drying process by raising temperature of the polymer through infrared heating. Here, the percentage of moisture content is measured under drying conditions in which a temperature is raised from room temperature up to about 180° C., and then the temperature is maintained at 180° C., wherein a total drying time is set as 20 minutes, including 5 minutes for a temperature rising step.

Next, the obtained hydrogel polymer is subjected to coarse-pulverization.

Here, a pulverizer to be used is not limited in view of constitution, but specifically, may include any one selected from pulverizing devices groups consisting of a vertical pulverizer, a turbo cutter, a turbo grinder, a rotary cutter mill, a cutter mill, a disc mill, a shred crusher, a crusher, a chopper, and a disc cutter, and is not limited to the above-described examples.

Here, the coarse-pulverization may be performed so that a particle diameter of the hydrogel polymer is about 2 to about 20 mm.

It is not technically easy to perform coarse-pulverization so as to have the particle diameter of less than 2 mm since the percentage of moisture content of the hydrogel polymer is high, and pulverized particles may aggregate with each other. On the other hand, when the coarse pulverization is performed to have the particle diameter of more than 20 mm, an effect of increasing the efficiency of the subsequent drying step may not be significant.

Next, the obtained hydrogel polymer is dried.

The hydrogel polymer which is subjected to coarse-pulverization as described above or which is formed immediately after the polymerization without performing the coarse-pulverization is subjected to drying. Here, a drying temperature of the drying step may be about 150 to about 250° C. When the drying temperature is less than 150° C., a drying time may be excessively increased, and physical properties of the finally formed super absorbent polymer may be deteriorated, and when the drying temperature is more than 250° C., only a surface of the polymer may be excessively dried, such that fine powder may occur in the subsequent pulverization process and physical properties of the finally formed super absorbent polymer may be deteriorated. Accordingly, preferably, the drying may be performed at a temperature of about 150 to about 200° C., and more preferably, about 160 to about 180° C.

Meanwhile, the drying may be performed for about 20 to about 90 minutes in consideration of process efficiency, etc., but time required for the drying is not limited thereto.

In addition, any drying method of the drying step may be used without limitation in view of constitution as long as it is generally used as a drying process of the hydrogel polymer. Specifically, the drying process may be performed by hot air supply, infrared irradiation, microwave irradiation, ultraviolet irradiation, etc. A percentage of moisture content of the polymer after the drying step is performed may be about 0.1 to about 10 wt %.

Next, the dried polymer obtained by the drying step is subjected to pulverization.

Polymer powder obtained after the pulverization step may have a particle diameter of about 150 µm or about 850 µm. A pulverizer used to perform the pulverization into the above-described particle diameter may be specifically a pin mill, a hammer mill, a screw mill, a roll mill, a disc mill, a jog mill, etc., but the present invention is not limited to the above-described examples.

In order to control physical properties of the super absorbent polymer powder which is manufactured as a final product after the pulverization step, the polymer powder obtained after pulverization is generally classified according to the particle diameter. Preferably, the polymer powder is classified into particles having a particle diameter of less than about 150 µm, particles having a particle diameter of about 150 to about 850 µm, and particles having a particle diameter more than 850 µm.

In the present specification, fine powder particles having a particle size of a predetermined particle size or less, i.e., less than about 150 µm, are referred to as super absorbent polymer fines, SAP fines or fines (fine powder), and particles having a particle diameter of about 150 to about 850 µm are referred to as normal particles. The fine powder may occur during the polymerization process, the drying process, or the pulverization step of the dried polymer. If the fine powder is included in final products, it is difficult to handle, and physical properties may be deteriorated, for example, gel blocking phenomenon may occur, etc. Therefore, it is preferred to exclude the fine powder so as not to include the fine powder in the final resin product or to reuse the fine powder to be normal particles.

As an example, a reassembly process in which the fine powder is aggregated to have a normal particle size may be performed. In order to increase aggregation strength during the reassembly process, a reassembly process in which the fine particles are agglomerated in a wet state is generally performed Here, the higher the percentage of moisture content of the fine powder, the higher the aggregation strength of the fine powder, but excessively large reassembly crumbs occur during the reassembling process, causing problems during process operation. When the lower the percentage of moisture content, the reassembling process is easy, but the aggregation strength is low, and thus there are many cases that the particles are crushed to be the fine powder again after reassembling process. In addition, the obtained fine reassembly has lower physical property such as centrifugal retention capacity (CRC) or absorption under pressure (AUP) than normal particles, which causes a decrease in quality of the super absorbent polymer.

Thus, according to the manufacturing method of the present invention, a fine powder reassembly is manufactured by mixing the fine powder having a particle diameter less than 150 μm and the coarse-pulverized hydrogel polymer.

More specifically, the fine powder, water, and an additive are mixed to prepare a fine powder aqueous solution, and the prepared fine powder aqueous solution and the coarse-pulverized hydrogel polymer are mixed to manufacture the fine powder reassembly.

Here, the additive included in the fine powder aqueous solution includes sodium hydroxide, a cross-linking agent, and a thermal polymerization initiator.

The sodium hydroxide (NaOH) may be included in a content of about 1 to about 10 wt %, or about 2 to about 8 wt %, or about 2 to about 6 wt % with respect to the fine powder aqueous solution, and may contribute to improvement of the CRC of the fine powder assembly.

The cross-linking agent serves to form a cross-linking structure between the fine powder particles to improve assembling strength. Examples of usable cross-linking agent may include polyethylene glycol diacrylate (PEGDA), hexane-1,6-diol diacrylate (HDDA), ethoxylated trimethylolpropane triacrylate (ETTA), ethylene carbonate (EC), and the like, and preferably polyethylene glycol diacrylate.

The cross-linking agent may be included in a content of about 0.1 to about 0.5 part by weight, preferably about 0.2 to about 0.4 part by weight, with respect to 100 parts by weight of the fine powder. When the cross-linking agent is included in the above-described range of parts by weight, high assembling strength and physical properties may be exhibited.

The thermal polymerization initiator serves to induce additional polymerization with respect to the fine powder to thereby improve assembling strength. Examples of usable thermal polymerization initiator may include sodium persulfate, potassium persulfate, and the like, and preferably, sodium persulfate.

The thermal polymerization initiator may be included in a content of about 0.1 to about 0.5 part by weight, preferably about 0.1 to about 0.3 part by weight, with respect to 100 parts by weight of the fine powder. When the thermal polymerization initiator is included in the above-described range of parts by weight, high assembling strength and physical properties may be exhibited.

The fine powder aqueous solution contains water so that the fine powder is are able to be reassembled in a wet state, wherein a content of water may be about 100 to about 300 parts by weight, preferably about 100 to about 200 parts by weight, with respect to 100 parts by weight of the fine powder.

According to an exemplary embodiment of the present invention, the fine powder aqueous solution may further include porous particles.

Here, the porous particle may be silica particle having a BET specific surface area of about 300 to about 1500 $m^2/g$ and a porosity of about 50% or more, for example, about 50 to about 98%. Further, the porous particle may have superhydrophobicity in which a contact angle to water is 125° or more, preferably 140° or more, and more preferably 145° or more.

By performing the fine powder reassembling process while further including the above-described porous particle in the fine powder aqueous solution, permeability and the aggregation strength of the fine powder reassembly may be further improved.

The porous particle may be included in a content of about 0.01 to about 0.4 part by weight, preferably about 0.05 to about 0.2 part by weight, with respect to 100 parts by weight of the fine powder. When the porous particle is included in the above-described range of parts by weight, high assembling strength and improved permeability may be exhibited.

The above-described additive and selectively the porous particles are added to the fine powder, thereby preparing the fine powder aqueous solution.

According to an exemplary embodiment of the present invention, water and the additive may be mixed to prepare an additive aqueous solution, the additive aqueous solution may be heated to a temperature of about 40 to about 80° C., preferably about 60 to about 80° C., and the fine powder may be mixed with the heated additive aqueous solution, thereby preparing the fine powder aqueous solution. By mixing the fine powder with the heated additive aqueous solution as described above, further improved aggregation strength may be exhibited.

Next, the prepared fine powder aqueous solution and the coarse-pulverized hydrogel polymer are mixed to prepare a fine powder reassembly.

The coarse-pulverized hydrogel polymer means that the hydrogel polymer obtained by thermal polymerization or photopolymerization of the above-described monomer composition is subjected to primary pulverization into crumbs having a large particle diameter before drying. Here, the coarse-pulverized hydrogel polymer may have a particle diameter of about 2 to about 20 mm, and has a hydrogel state having a percentage of moisture content of about 40 to about 80 wt % since it is not dried.

According to the present invention, the fine powder aqueous solution may be mixed with the coarse-pulverized hydrogel polymer to form the fine powder reassembly, and the fine powder reassembly obtained in this way may have physical properties that are maintained at a similar level to those of the original hydrogel polymer together with high assembling strength, thereby obtaining a high-quality fine powder reassembly.

According to an exemplary embodiment of the present invention, the coarse-pulverized hydrogel polymer may be mixed in about 50 to about 500 parts by weight, preferably about 50 to about 300 parts by weight, with respect to 100 parts by weight of the fine powder included in the fine powder aqueous solution. When the coarse-pulverized hydrogel polymer is included in the above-described range of parts by weight, high assembling strength and improved physical properties may be exhibited.

The method of adding the fine powder aqueous solution to the coarse-pulverized hydrogel polymer has no limitation in constitution thereof. For example, a method in which the fine powder aqueous solution and the coarse-pulverized hydrogel polymer are added and mixed in a reaction vessel, a method in which the fine powder aqueous solution is sprayed into the hydrogel polymer, and a method in which the fine powder aqueous solution and the coarse-pulverized hydrogel polymer are continuously supplied and mixed in a reactor such as a continuously operating mixer, or the like, may be used.

According to an exemplary embodiment of the present invention, it is possible to further include a step of drying, pulverizing and classifying the obtained fine powder reassembly.

The step of drying the fine powder reassembly may be performed at a temperature of 150 to 250° C. for 20 to 90 minutes. In addition, the means of raising the temperature for the drying is not limited in view of a constitution.

Specifically, the raising of the temperature may be performed by supplying thermal media or directly heating by electricity, etc., but the present invention is not limited to the above-described examples. Specific examples of heat sources to be usable may include steam, electricity, ultraviolet rays, infrared rays, etc., and may be a heated thermal fluid, etc.

Next, the dried fine powder reassembly may be pulverized to have a particle diameter of about 150 to about 850 μm. A pulverizer used to perform the pulverization into the above-described particle diameter may be specifically a pin mill, a hammer mill, a screw mill, a roll mill, a disc mill, a jog mill, etc., but the present invention is not limited to the above-described examples.

The fine powder reassembly obtained according to the manufacturing method of the present invention has high aggregation strength since a ratio in which the fine powder reassembly is manufactured, dried, pulverized, and recrushed into the fine powder is low as described above.

In the reassembling polymer obtained according to the manufacturing method of the present invention, for example, a weight ratio in which the fine powder having a particle diameter of 150 μm or less is manufactured after pulverization is less than about 15%, preferably less than about 10%, and more preferably less than about 7%, with respect to a total weight of the fine powder reassembly.

Further, the fine powder reassembly obtained after pulverization may be classified into particles having a particle diameter of less than about 150 μm, particles having a particle diameter of about 150 to about 850 μm, and particles having a particle diameter of more than 850 μm according to particle diameters.

The classified fine powder reassembly may be subjected to a surface cross-linking process alone or in combination with other normal particles.

Further, the surface cross-linking process is a step of increasing a cross-linking density near a surface of the super absorbent polymer particle in relation to a cross-linking density in the particle. In general, a surface cross-linking agent is applied to the surface of the super absorbent polymer particle. Thus, this reaction is generated on the surface of the super absorbent polymer particles, which improves crosslinkability on the surface of the particles without substantially affecting an inside of the particles. Accordingly, surface cross-linked super absorbent polymer particles have a higher cross-linking degree in the vicinity of the surface than in the inside.

Here, the surface cross-linking agent is not limited in view of constitution as long as it is a compound capable of reacting with a functional group of the polymer.

Preferably, in order to improve properties of the super absorbent polymer to be manufactured, as the surface cross-linking agent, at least one selected from the group consisting of a polyhydric alcohol compound; an epoxy compound; a polyamine compound; a haloepoxy compound; a condensation product of the haloepoxy compound; oxazoline compounds; mono-, di- or polyoxazolidinone compound; a cyclic urea compound; a polyvalent metal salt; and an alkylene carbonate compound, may be used.

Specific examples of the polyhydric alcohol compound may include at least one selected from the group consisting of mono-, di-, tri-, tetra- or polyethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexane dimethanol.

Further, the epoxy compound may be ethylene glycol diglycidyl ether and glycidol, etc. The polyamine compound may be at least one selected from the group consisting of ethylene diamine, diethylene triamine, triethylene tetramine, tetraethylene pentamine, pentaethylene hexamine, polyethylene imine, and polyamide polyamine.

Further, the haloepoxy compound may be epichlorohydrin, epibromohydrin, and α-methyl epichlorohydrin. Meanwhile, examples of the mono-, di- or polyoxazolidinone compound may include 2-oxazolidinone, etc.

In addition, ethylene carbonate, etc., may be used as the alkylene carbonate compound. The above-described compounds may be used alone, respectively, or may be combined with each other. Meanwhile, in order to increase efficiency of the surface cross-linking process, it is preferable to use at least one polyhydric alcohol compound among these surface cross-linking agents, more preferably a polyhydric alcohol compound having 2 to 10 carbon atoms.

The content of the surface cross-linking agent to be added may be appropriately selected depending on the specific kind of the surface cross-linking agent to be added and reaction conditions, but generally, may be about 0.001 to 5 parts by weight, preferably about 0.01 to about 3 parts by weight, and more preferably about 0.05 to about 2 parts by weight, with respect to 100 parts by weight of the polymer.

When the content of the surface cross-linking agent is excessively small, a surface cross-linking reaction hardly occurs. When the content of the surface cross-linking agent is more than 5 parts by weight with respect to 100 parts by weight of the polymer, absorption ability and physical properties may be deteriorated due to excessive surface cross-linking reaction.

The surface cross-linking reaction and the drying may be performed simultaneously by heating the polymer particles to which the surface cross-linking agent is added.

The means of raising the temperature for the surface cross-linking reaction is not particularly limited. The polymer particles may be heated by supplying thermal media or directly supplying heat sources. Here, examples of the thermal media to be usable may include temperature-raising fluids such as steam, hot air, and hot oil, etc. However, the present invention is not limited to the above-described examples. In addition, a temperature of the supplied thermal media may be appropriately selected in consideration of the means of thermal media, the raising rate of the temperature, and target temperature in raising temperature. Meanwhile, examples of the heat source to be directly supplied may include heating through electricity, and heating through gas. However, the present invention is not limited to the above-described examples.

The super absorbent polymer manufactured by the above-described method is a super absorbent polymer in which a fine powder reassembly, which is obtained by mixing fine powder with sodium hydroxide and performing reassembly, is subjected to surface cross-linking, wherein the fine powder has a particle diameter of less than 150 μm in a polymer obtained by polymerizing a water-soluble ethylenically unsaturated monomer in which an acidic group is included and at least one portion of the acidic group is neutralized, wherein a centrifugal retention capacity (CRC) measured according to EDANA method WSP 241.3 is 33.0 to 39.0 g/g; a 0.7 psi absorption under pressure (AUP) measured according to EDANA method WSP 241.3 is 20.0 to 25.0 g/g; and an absorption speed by a vortex method is 100 seconds or less.

In the super absorbent polymer of an exemplary embodiment, the polymer is obtained by polymerizing the water-soluble ethylenically unsaturated monomer in which the acidic group is included and at least one portion of the acidic group is neutralized. Specific details of specific materials used therefor and manufacturing method thereof are the same as those illustrated above in the preparation method of the hydrogel polymer.

Further, in the super absorbent polymer of an exemplary embodiment of the present invention, the fine powder refers to particles having a particle diameter of less than 150 μm in the polymer, and may include all fine powder generated in all processes of the super absorbent polymer such as the polymerization process, the drying process, the pulverization process of the dried polymer, the surface cross-linking process, and the like, regardless of the step in which the fine powder is generated, whether surface cross-linking is performed, or the like.

The fine powder reassembly may be manufactured by mixing sodium hydroxide and the fine powder and performing reassembly, or by further mixing the cross-linking agent, the thermal polymerization initiator, or the porous particles in addition to sodium hydroxide and performing reassembly. A more detailed description of the cross-linking agent, the thermal polymerization initiator, or the porous particles is the same as described in the above-described manufacturing method of a super absorbent polymer.

The sodium hydroxide may be included in a content of about 0.1 to about 20 parts by weight, or about 1 to about 15 parts by weight, or about 1 to 10 parts by weight, with respect to 100 parts by weight of the fine powder. When the sodium hydroxide is included in the above-described range of parts by weight, it may contribute to high assembling strength, improved permeability, and improvement of centrifugal retention capacity (CRC).

In addition, the fine powder may be obtained by mixing the coarse-pulverized hydrogel polymer and performing reassembly. A more detailed description of the mixing with the coarse-pulverized hydrogel polymer is the same as described above in the manufacturing method of super absorbent polymer.

The super absorbent polymer which is obtained by surface cross-linking the reassembled fine reassembly as described above may have the centrifugal retention capacity (CRC) measured according to EDANA method WSP 241.3 of about 33.0 to about 39.0 g/g, or about 34.0 to about 38.0 g/g. In addition, the 0.7 psi absorption under pressure (AUP) measured according to EDANA method WSP 241.3 may be about 20.0 to about 25.0 g/g, or about 21.0 to about 25.0 g/g.

Further, in the super absorbent polymer, an absorption speed by a vortex method may be about 100 seconds or less or about 95 seconds or less. The measurement by the vortex method is performed by putting 50 ml of saline into a 100 ml beaker together with a magnetic stirring bar, setting a stirring speed of the magnetic stirring bar to 600 rpm using a stirrer, putting 2.0 g of a super absorbent polymer into the stirring saline and simultaneously measuring the time when putting the super absorbent polymer, and then measuring the time (unit: second) taken until vortex disappears in the beaker, which is set as the vortex time. The lower limit value of the absorption speed is not particularly limited, but may be about 20 seconds or more, or about 30 seconds or more.

Hereinafter, the present invention is described in detail with reference to Examples. However, the following Examples are only illustrative of the present invention, and do not limit the disclosure of the present invention in any way. Further, unless otherwise specified, "%" and "part" representing the content in the following Examples and Comparative Examples are on a mass basis.

EXAMPLE

Manufacture of Super Absorbent Polymer Particle

Preparation Example 1

100 g of acrylic acid, 0.3 g of polyethyleneglycol diacrylate as a cross-linking agent, 0.033 g of diphenyl(2,4,6-trimethylbenzoyl)-phosphine oxide as an initiator, 38.9 g of caustic soda (NaOH), and 103.9 g of water were mixed to prepare a monomer mixture having a monomer concentration of 50 wt %.

Then, the monomer mixture was put on a continuously moving conveyor belt, irradiated with ultraviolet light (irradiation amount: 2 mW/cm$^2$), followed by UV polymerization for 2 minutes, thereby obtaining a hydrogel polymer.

The hydrogel polymer was pulverized with a meat chopper (hole size of 8 mm) to obtain a coarse-pulverized hydrogel polymer. The hydrogel polymer was dried in a hot air dryer at 170° C. for 2 hours, pulverized with a pin mill, and classified with a standard mesh of ASTM standard to obtain normal particles having a particle size of 150 μm to 850 μm and fine powder particles having a particle diameter of less than 150 μm.

Preparation Example of Fine Powder Reassembly

Example 1

An additive aqueous solution including 1,500 ppm of sodium persulfate (SPS), 3,000 ppm of polyethyleneglycol diacrylate (PEGDA), 1,000 ppm of silica aerogel (AeroZel™, JIOS), and 3 wt % of sodium hydroxide was prepared, and heated to 80° C. 750 g of the heated additive aqueous solution and 500 g of the fine powder having a particle diameter of less than 150 μm obtained in Preparation Example 1 were mixed for 1 minute using a planetary mixer. To this mixture, 500 g of the coarse-pulverized hydrogel polymer obtained in Preparation Example 1 was added and further mixed for 1 minute, thereby manufacturing a fine powder reassembly.

The manufactured reassembly was pulverized through a meat chopper. Then, the obtained reassembly was dried in a hot air dryer at a temperature of 180° C. for 30 minutes, repulverized using a rotary mixer, and classified with a standard mesh of ASTM standard into particles having a particle diameter of less than 150 μm and particles having a particle diameter of 150 μm or more to 850 μm or less.

100 g of the classified particles having a particle diameter of 150 μm or more to 850 μm or less were mixed with a surface cross-linking solution including 0.2 g of poly(ethyleneglycol)diglycidylether, 3 g of methanol, 5 g of water, and 0.01 g of silica aerogel (AeroZel™, JIOS), followed by a surface cross-linking reaction at a temperature of 180° C. for 50 minutes, thereby obtaining a final super absorbent polymer.

Example 2

A super absorbent polymer was manufactured in the same manner as in Example 1, except that 250 g of the fine powder and 750 g of the coarse-pulverized hydrogel polymer were used.

Comparative Example 1

1,000 g of the coarse-pulverized hydrogel polymer obtained in Preparation Example 1 was dried in a hot air dryer at a temperature of 180° C. for 30 minutes, repulverized using a rotary mixer, and classified with a standard mesh of ASTM standard into particles having a particle diameter of less than 150 μm and particles having a particle diameter of 150 μm or more and 850 μm or less.

100 g of the classified particles having a particle diameter of 150 μm or more to 850 μm or less were mixed with a surface cross-linking solution including 0.2 g of poly(ethyleneglycol)diglycidylether, 3 g of methanol, 5 g of water, and 0.01 g of silica aerogel (AeroZel™, JIOS), followed by a surface cross-linking reaction at a temperature of 180° C. for 50 minutes, thereby obtaining a final super absorbent polymer.

Experimental Example

In order to evaluate physical properties of the fine powder reassembly, physical properties of the super absorbent polymers (polymer before surface cross-linking and polymer after surface cross-linking) that were manufactured by the methods according to Comparative Example 1 and Examples 1 to 2 were evaluated by the following methods, and the results were shown in Table 1.

(1) Centrifugal Retention Capacity (CRC)

The centrifugal retention capacity (CRC) of each of the super absorbent polymers manufactured in Examples 1 to 2 and Comparative Example 1 was measured before and after the surface cross-linking reaction, respectively. The centrifugal retention capacity was measured on the basis of EDANA method WSP 241.3. 0.2 g of a sample including a particle diameter of 300 to 600 μm in the manufactured super absorbent polymer was put into a tea bag and precipitated in 0.9% brine solution for 30 minutes. Then, dehydration was performed for 3 minutes with 250 G (gravity) of centrifugal force, and an amount at which the brine solution was absorbed was measured.

(2) Absorption Under Pressure (AUP)

The absorption under pressure was measured for each of the super absorbent polymers manufactured in Examples 1 and 2 and Comparative Example 1. The absorption under pressure was measured on the basis of EDANA method WSP 241.3. A 0.9 g of a sample including a particle diameter of 300 to 600 μm in the manufactured super absorbent polymer was put into a cylinder defined by EDANA, and a pressure of 0.7 psi was applied using piston and weight. Then, the amount at which the 0.9% brine solution was absorbed for 60 minutes was measured.

(3) Absorption Speed (Vortex)

The absorption speed was measured for each of the super absorbent polymers manufactured in Examples 1 and 2 and Comparative Example 1. The absorption speed was measured by putting 50 ml of saline into a 100 ml beaker together with a magnetic bar. The agitation speed was set to 600 rpm using a stirrer. 2.0 g of the super absorbent polymer was put into the stirring saline, and the time when putting the super absorbent polymer was simultaneously measured. The time measurement was terminated at the point when the vortex disappeared in the beaker.

(4) Permeability

The permeability was measured for each of the super absorbent polymers manufactured in Examples 1 and 2 and Comparative Example 1.

Water was filled in reverse so as to prevent air bubbles from forming between a chromatographic tube bottom glass filter and a cock, to fill up to about 10 mL, the chromatographic tube bottom glass filter was washed 2-3 times with brine, and filled with 0.9% brine to a volume of 40 mL or more. The piston was put into the chromatographic tube, the bottom valve was opened, and the time taken until the liquid level reaches from the 40 mL mark to the 20 mL mark was recorded (B: sec), thereby performing a Blank experiment. 0.2 g of the sample including a particle diameter of 300 to 600 μm in the manufactured super absorbent polymer was added, and then brine was added so that the total amount of the brine was adjusted to 50 mL. The super absorbent polymer was allowed to stand for 30 minutes so that the super absorbent polymer was sufficiently swollen. The piston (0.3 psi) with a weight was put into the chromatographic tube and allowed to stand for one minute. The time (T1: sec) taken until the liquid level reaches from the 40 mL mark to the 20 mL mark where the cap at the bottom of the chromatographic tube was opened, was recorded. The permeability was represented by the following equation.

Permeability=$T1-B$

TABLE 1

| | Before surface cross-linking | After surface cross-linking | | | |
|---|---|---|---|---|---|
| | Centrifugal retention capacity (CRC) unit: g/g | Centrifugal retention capacity (CRC) unit: g/g | Absorption under pressure (AUP) unit: g/g | Absorption speed unit: sec | Permeability unit: sec |
| Example 1 | 43.5 | 37.2 | 22.8 | 68 | 570 |
| Example 2 | 42.5 | 36.0 | 22.7 | 94 | 410 |
| Comparative Example 1 | 41.7 | 36.2 | 22.6 | 137 | 388 |

Referring to Table 1, the super absorbent polymer obtained by performing the fine powder reassembly process according to the manufacturing method of the present invention showed physical properties such as centrifugal retention capacity (CRC), absorption under pressure (AUP), absorption speed, permeability, etc., that are improved or equaled before the fine powder reassembly process is performed.

What is claimed is:

1. A super absorbent polymer, comprising:
   a surface crosslinked fine powder reassembly, which is obtained by mixing a fine powder, sodium hydroxide, a porous particle, and a coarse-pulverized hydrogel polymer to prepare a fine powder reassembly, and then subjecting the fine powder reassembly to surface cross-linking, wherein the fine powder has a particle diameter of less than 150 μm and the coarse-pulverized hydrogel polymer has a particle diameter of 2 to 20 μm,
   wherein the fine powder and the coarse-pulverized hydrogel polymer are obtained by polymerizing a water-soluble ethylenically unsaturated monomer to form a hydrogel polymer, wherein the water-soluble ethylencially unsaturated monomer has an acidic group and at least one portion of the acidic group is neutralized, and pulverizing the hydrogel polymer to obtain the fine powder and the coarse-pulverized hydrogel polymer,
   wherein the super absorbent polymer has a centrifugal retention capacity (CRC) measured according to EDANA method WSP 241.3 is 33.0 to 39.0 g/g;
   a 0.7 psi absorption under pressure (AUP) measured according to EDANA method WSP 241.3 is 20.0 to 25.0 g/g; and
   an absorption speed of 100 seconds or less, wherein the absorption speed is measured by adding 2 g of the superabsorbent polymer at 600 rpm to a 100 ml beaker containing 50 ml of saline, stirring at 600 rpm, and measuring the time from the addition of the superabsorbent polymer until a vortex disappears in the beaker.

2. The super absorbent polymer of claim 1, wherein:
the sodium hydroxide is mixed in a content of 0.1 to 20 parts by weight with respect to 100 parts by weight of the fine powder.

3. The super absorbent polymer of claim 1, wherein:
the porous particles are silica particles having a BET specific surface area of 300 to 1500 $m^2/g$ and a porosity of 50% or more.

4. The super absorbent polymer of claim 1, wherein:
the porous particles are mixed in a contend of 0.01 to 0.4 parts by weight with respect to 100 parts by weight of the fine powder.

* * * * *